United States Patent [19]

Balchunis et al.

[11] Patent Number: 4,463,114
[45] Date of Patent: Jul. 31, 1984

[54] ANTISTATIC FILMS

[75] Inventors: Robert J. Balchunis; Frank T. Sher, both of St. Paul, Minn.

[73] Assignee: Minnesota Mining and Manufacturing Company, St. Paul, Minn.

[21] Appl. No.: 363,870

[22] Filed: Mar. 31, 1982

[51] Int. Cl.³ .............................................. C08L 83/06
[52] U.S. Cl. .................................. 524/157; 428/447; 524/265; 524/266; 528/31; 528/43
[58] Field of Search ................ 428/447; 524/157, 262, 524/265, 266; 528/12, 14, 15, 19, 20, 21, 26

[56] References Cited

U.S. PATENT DOCUMENTS

| | | | |
|---|---|---|---|
| 3,161,611 | 12/1964 | Rossmy | 260/29.2 |
| 4,101,513 | 7/1978 | Fox | 528/19 |
| 4,221,691 | 9/1980 | Danielson | 528/12 |
| 4,231,910 | 11/1980 | Plueddemann | 524/262 |
| 4,248,750 | 2/1981 | Murakami et al. | 260/29.1 |
| 4,294,950 | 10/1981 | Kato | 528/14 |
| 4,299,746 | 11/1981 | Frye | 524/266 |
| 4,368,313 | 1/1983 | Hayes | 528/19 |

*Primary Examiner*—Paul R. Michl
*Attorney, Agent, or Firm*—Donald M. Sell; James A. Smith; Lorraine R. Sherman

[57] ABSTRACT

A hydroxyorganosilane composition which upon curing provides a polymer that is an electrical conductor is disclosed. The composition comprises 1 to 95 weight percent of a hydrolyzate of a hydroxyorganosilane and optionally up to 50 weight percent of a silanol-sulfonate compound. When the cured polymer, which has a siloxane backbone, is a film in a composite structure, the resultant article has antistatic properties.

19 Claims, No Drawings

ANTISTATIC FILMS

DESCRIPTION

TECHNICAL FIELD

The present invention relates to a hydroxyorganosilane composition which upon curing provides a polymer that is electrically conductive. When the cured polymer is a film in a composite structure, the resultant article has antistatic properties. Methods of preparing the conducting composition and composite structure are disclosed.

BACKGROUND ART

Many organic materials, especially polymers and polymeric films, display a decided tendency to acquire an electrostatic charge when handled or processed. This results in a number of known practical difficulties, for example, in manufacturing operations and subsequent uses. The prior art has dealt with the control of static charges by bleeding them off using conductive materials as antistatic agents. Varying degrees of success have been obtained with inorganic metallic foils, vacuum metallizing, and conductive coatings on polymeric substrates.

Polymers having antistatic properties have been prepared by free-radical or cationic polymerization of certain vinyl monomers. U.S. Pat. No. 4,248,750 relates to a linear siloxane with pendant vinyl groups that cross-links by hydrosilation to provide a polymer having both silane-type and carbon-type linkages in its backbone. W. German Offenlegungsschrift No. 2,051,832 discloses a vinyl monomer copolymerized with a silanol-containing vinyl monomer, hydrolyzed with sulfuric acid, and then cured to produce an antistatic polymer having a large proportion of carbon to carbon linkages in its backbone.

Also known in the art are polymers having antistatic properties which have been prepared by polymerization through a silicon functionality. In U.S. Pat. No. 4,294,950 monomers having silane and epoxide functionality are subjected to hydrolysis of the silane moieties to provide silanols. Polymerization and curing in the presence of polyvalent carboxylic acids and curing agents provide polymers having backbone polyester and siloxane groups.

Antistatic prior art materials frequently suffer from a serious performance deficiency; namely, a critical dependence of conductivity on relative humidity. Prior art materials, other than metal-like conductors, provide little, if any, static protection below 20 percent relative humidity. Many such materials impart a greasy feel to the article and the antistatic performance can be adversely affected by washing with solvents. These materials frequently exhibit inadequate abrasion resistance, durability, and transparency. There remains a need in the art for polymeric materials having antistatic properties at very low relative humidities.

Dilute aqueous solutions of certain terminal monohydroxy-substituted organosilanols have been disclosed in U.S. Pat. No. 3,161,611 as useful for impregnation of paper, textiles, leather and other materials. Coating compositions comprising these silanols are not described. Aqueous di- or polyhydroxy-substituted organosilanols, with or without silanol-sulfonate compounds, are novel in the art. The cured coated compositions of any of the above materials have not been previously disclosed.

DISCLOSURE OF THE INVENTION

Briefly, the present invention provides a composition comprising a hydroxyorganosilane, and optionally, a sulfonic acid-substituted organosilane, which cures to a transparent, durable, conductive polymer having a siloxane backbone and which has antistatic properties even at relative humidities of 7 percent or lower.

In another aspect, the present invention provides a conductive composite structure comprising: (1) a suitable substrate coated on at least one surface with (2) a composition comprising the cured reaction product of a hydroxyorganosilane and, optionally, a sulfonato-organosilicon compound. The conductive composite can be optionally overcoated on any exposed surface with another film. A substrate coated with the conductive film of the present invention is useful to remove or draw-off static electric charges, has an electrical conductivity which is relatively independent of humidity, and can possess both antifogging characteristics and cation exchangeability. The conductive composite structure, when comprising an overcoated polymeric film having specific properties can possess additional desirable characteristics, such as high abrasion resistance, imageability, or adhesiveness. Surprisingly, such constructions retain superior surface conductivities even though the overcoating film is non-conductive.

In another aspect, the present invention provides conductive polymeric compositions which are prepared by the condensation polymerization of hydroxy and polyhydroxy group-containing organic monomers from essentially aqueous solution, preferably using acid catalysts to help promote polymerization. During the condensation reaction water is removed from sulfonated or non-sulfonated hydroxyalkyl-substituted silanols, siloxanols, or oligomers thereof, or polysiloxanes containing silanol groups or hydrolyzable protected silanol groups. The use of acid catalysts in curing the monomers of this invention is desirable even when the monomers contain "built-in" acidic groups such as sulfonic acid groups. On curing, these monomers form hard, solvent resistant, conductive polymeric films of high dielectric constant which are useful for drawing off potential static charges, function relatively independently of humidity (surprisingly, even down to a relative humidity of 7 percent or lower), and may possess antifogging characteristics.

As used in this application:

"hydroxyorganosilane" means any organic group-substituted silane, wherein the organic group is covalently attached to a silicon atom through a carbon atom, and wherein the organic group has at least one attached hydroxy group;

"sulfonato-organosilicon compound", often referred to herein as silanol-sulfonate, means any organic group-substituted silane, wherein the organic group is covalently attached to a silicon atom through a carbon atom, and wherein the organic group has at least one attached sulfonic acid group (or its salt form);

"solution" means mixtures and compositions wherein water is present. Such solutions may use water as the only solvent, or they may employ combinations of water with water-miscible organic solvents such as alcohol and acetone. Further, substantial amounts of organic solvents may be included in the combinations;

"film" means a cured, polymerized organic composition;

"cured" means crosslinked to a three-dimensional structure;

"coating composition" means an uncured organic composition; and

"exhaustive hydrolysis" means a reaction of hydrolyzable groups with water at low pH, preferably of pH less than 2, to generate a hydroxy-substituted group.

The present invention provides for the preparation and application of low cost organosilanes which upon curing provide polymers having excellent conductivity and abrasion-resistance which extends their applications beyond the limits of typical antistatic agents. The polymeric compositions described in this invention show excellent durability in terms of both solvent and abrasion resistance. The cured polymers of this invention are clear, tintable, and flexible, and they are easily prepared and applied. Moreover, these materials function not only as excellent top coatings in antistatic and antifogging applications, but they also display conductive properties as undercoatings or sub-layers in composite constructions in a variety of applications wherein surface charges need to be electrically grounded or dissipated.

While there is no clear division between conductive and resistive films, it is generally considered that a material having a resistivity of greater than $10^{13}$ ohms per square (ohms/sq) shows insulating properties, while a material having a resistivity of less than $10^{13}$ ohms/sq exhibits conductive properties.

The conductive polymeric films of the invention may be self-supporting or they may be formed by coating a composition onto a substrate and curing this coating to form the conductive polymeric film. Optionally, overcoating compositions can be incorporated in the composite structure. One or more compositions can be overcoated onto either surface of the conductive film-coated substrate and then cured. For example, an optional overcoating can be a highly abrasion resistant polymeric film, a photographic film, an adhesive layer, a dielectric layer, or a low adhesion backsize.

DETAILED DESCRIPTION OF THE INVENTION

The present invention provides a composite structure comprising:

a. a substrate, b. a cured film on at least one surface of said substrate, said film comprising a cured hydroxyorganosilane, and optionally an organic group-substituted silane, wherein said organic group is covalently attached to a silicon atom through a carbon atom, and wherein said organic group has at least one sulfonic acid group, or its salt form, attached thereto, and c. optionally, a second continuous or discontinuous layer may be adhered on any exposed surface.

Preferably, the curable hydroxyorgaosilane composition of the present invention is coated upon a substrate and subjected to in situ energy curing.

The coating composition of the present invention comprises:

1. 1 to 95 weight percent of a silane hydrolyzate derivative of an organosilane dissolved in 5 to 99 weight percent of an aqueous solvent, said organosilane having the general formula $$R^1\ Si(OR^2)_3 \qquad I$$

wherein $R^1$ is a hydroxy- or polyhydroxy-substituted organic group preferably selected from:

a. alkyl groups having from 2 to 8 carbon atoms and substituted by 1 to 7, and preferably 2 to 7, hydroxy groups, with any single carbon atom having at most one hydroxy group attached;

b. alkyl groups and cyclic alkyl groups having up to 20 carbon atoms, which carbon chain may be interrupted by one or more oxygen atoms and containing at least one, and preferably at least 2, hydroxy group per 8 carbon atoms, with any single carbon atom having at most one hydroxy group attached;

c. aralkyl or alkaryl groups containing 7 to 10 carbon atoms, said aralkyl or alkaryl group having 1 to 8, and preferably 2 to 8, hydroxy groups, with any single carbon atom having at most one hydroxy group attached;

d. alkenyl group containing up to 8 carbon atoms and 1 to 5, and preferably 2 to 5, hydroxy groups, with any single carbon atom having at most one hydroxy group attached;

e. cyclic or alkyl-substituted cyclic groups having up to 8 carbon atoms and substituted by 1 to 7, and preferably 2 to 7, hydroxy groups, with any single carbon atom having at most one hydroxy group attached; and f. those precursor groups such as epoxy, ketal, acetal and ester which, on exhaustive hydrolysis, provide the aforementioned hydroxy, and preferably dihydroxy or polyhydroxyalkyl, groups.

Wherever the term "group" is used in the definition of a term (as in alkyl group versus alkyl), the term connotes the possibility of substitution recognized by the art as not affecting the functional nature of the chemical term. Where the term "aralkyl or alkaryl group" is used, unsubstituted or substituted phenyl is anticipated, and substituent groups include, for example, lower alkyl of 1 to 4 carbon atoms, nitro, halo, cyano, hydroxy, and ether groups, with no more than one substituent group on any carbon atom of the phenyl group.

$R^1$ most preferably is a dihydroxy-substituted alkyl group containing 4 to 8 carbon atoms whose chain may be interrupted by one or two oxygen atoms or the appropriate hydroxy precursor which on exhaustive hydrolysis gives the most preferred $R^1$ group; and $R^2$ is selected from (1) hydrogen, and (2) any organic group such that the —Si(OR$^2$)$_3$ moiety is hydrolyzable. For example, useful groups include straight chain or branched alkyl, alkaryl, acyl, or aroyl group having up to 8 carbon atoms which allows hydrolysis of the —Si(OR$^2$)$_3$ moiety to give a silanol hydrolyzate or oligomers thereof. Useful groups include methyl, ethyl, octyl, methoxyethyl, acetyl, phenyl, benzyl, and benzoyl.

Organosilanes in which $R^1$ is a dihydroxy-substituted alkyl group is most preferred due to the ease of preparation of these materials and the ready availability of starting materials.

Examples of organosilanes having the general Formula I above are:

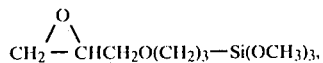

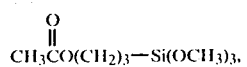

-continued
HO—CH₂CH₂CH₂O(CH₂)₃—Si(OH)₃,
|
OH

HO—(CH₂)₃—Si(OH)₃, and
HO—(CH₂)₃—Si(OCH₃)₃.

2. From 0 up to about 50 weight percent of a sulfonato-organosilicon compound (referred to hereinafter as silanol-sulfonate) may be added, said silanol-sulfonate compound having the general formula

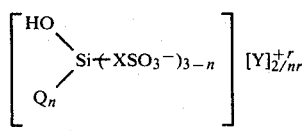

wherein
Q is selected from hydroxyl, alkyl groups containing from 1 to 4 carbon atoms, and alkoxy groups containing from 1 to 4 carbon atoms;
X is an organic linking group;
Y is any organic or inorganic cation. Preferably Y is selected from hydrogen, alkali metals (e.g., lithium, sodium, potassium), alkaline earth metals (e.g., magnesium, calcium), transition metals (e.g., manganese, cobalt, copper, zinc), heavy metals (e.g., lead), organic cations of protonated weak bases having an average molecular weight of less than about 400 and a pK$_a$ of less than about 11 (e.g., 4-aminopyridine, 2-methoxyethylamine, benzylamine, 2,4-dimethylimidazole, 3-[2-ethoxy(2-ethoxyethoxy)]propylamine), and organic cations of strong organic bases having an average molecular weight of less than about 400 and a pK$_a$ of greater than about 11 [e.g., ⁺P(CH₂C₆H₅)(C₆H₅)₃, ⁺N(CH₃)₄, ⁺N(CH₂CH₃)₄]; most preferably Y is hydrogen;
r is equal to the valence of Y; and
n is 1 or 2; with the proviso that the mole ratio of silanol-sulfonate to organosilane is less than 5 to 1.

X is any organic linking group containing up to 10 carbon atoms and not functionally involved in the polymerization of the molecule. Preferably X is selected from alkylene groups having at least two or more methylene groups, cycloalkylene groups, alkyl-substituted cycloalkylene groups, hydroxy-substituted alkylene groups, hydroxy-substituted mono-oxa alkylene groups, divalent hydrocarbon groups having mono- or poly-oxa backbone substitution, divalent hydrocarbon groups having mono-thia backbone substitution, divalent hydrocarbon groups having dioxo-thia backbone substitution, divalent hydrocarbon groups having monooxo-thia backbone substitution, arylene groups, arylalkylene groups, alkylarylene groups, substituted alkylarylene groups, and alkylarylalkylene groups. Most preferably, X is selected from alkylene groups having at least two or more methylene groups or such hydroxy-substituted alkylene groups and hydroxy-substituted mono-oxa alkylene groups having a total of up to 10 carbon atoms.

Where a silanol-sulfonate compound is used it is present in the range of 0.001 to 50 weight percent.

Organosilanol-sulfonic acids are a preferred class of compounds within Formula II and are present in the most preferred coating solutions and films of the present invention. These compounds have the formula

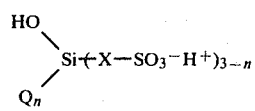

wherein Q, X and n are each as described above. Examples of organosilanol-sulfonic acids of Formula III are

 (IIIA)

 (IIIB)

 (IIIC)

In these formulae, X is as described above and Q' is an alkyl group which contains from 1 to 4 carbon atoms. Representative compounds or oligomers of Formulae III(A-C) include:

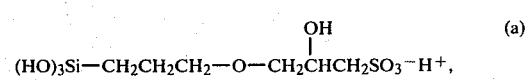 (a)

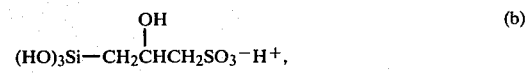 (b)

(HO)₃Si—CH₂CH₂SO₃⁻H⁺, (c)
(HO)₃Si—CH₂CH₂CH₂SO₃⁻H⁺, (d)

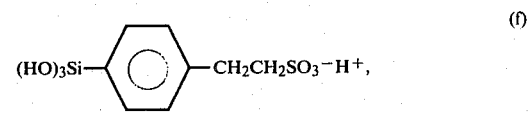 (e)

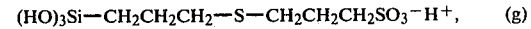 (f)

(HO)₃Si—CH₂CH₂CH₂—S—CH₂CH₂CH₂SO₃⁻H⁺, (g)

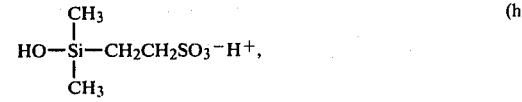 (h)

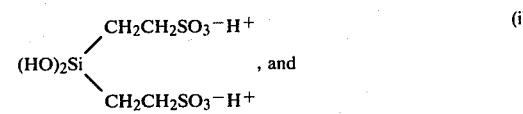 (i) , and

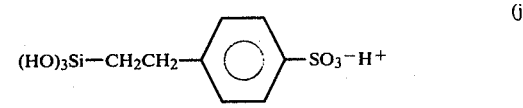 (j)

Of these specific compounds, those of formulae (a), (c), (d) and (i) are preferred, with compound (a) being particularly preferred. Useful starting materials in the preparation of compounds (a) through (i) above are disclosed in U.S. Pat. No. 4,235,638, col. 6, and the starting material of compound (j) is disclosed in U.S. Pat. No.

2,968,643 (Exs. IV and V), both patents being incorporated herein by reference.

The aqueous solutions of the organosilanolsulfonic acids are acidic and they usually have a pH of less than about 5. Preferably, they have a pH of less than about 3. Most preferably, they have a pH in the range of about 0.5–2.5.

Organosilanol-sulfonic acid salts represent another class of compounds within Formula II which are useful in either or both the solutions and cured compositions of the present invention. These compounds are well-known in the art and have the formula

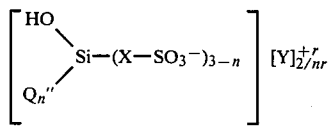

wherein X, n and r are each as described above, Q" is selected from hydroxyl and alkyl groups containing from 1 to 4 carbon atoms, and Y is as described above except Y is not hydrogen. Examples of organosilanolsulfonic acid salts of Formula IV are: (a) $(HO)_3Si-CH_2CH_2SO_3^-K^+$, (b) $(HO)_2Si-(CH_2CH_2SO_3^-Na^+)_2$, (c) $(HO)_3SiCH_2CH_2CH_2SO_3^-N^+(C_2H_5)_4$, and (d) $(HO)_3SiCH_2CH_2CH_2O-CH_2CH(OH)CH_2SO_3^-Ba_{\frac{1}{2}}^{+2}$.

The aqueous solutions of the organosilanol-sulfonic acid salts are approximately neutral. Thus, they have a pH in the range of about 5 to 9.

Compounds represented by Formulae I, II, III, and IV above may also exist as oligomers in aqueous solution and are useful as such in the present invention.

Optionally, monomeric or polymeric alkyl-, aryl-, alkaryl-, and aralkyl-sulfonic acids having up to 20 carbon atoms per sulfonic acid group (e.g., dodecylbenzenesulfonic acid, benzenesulfonic acid, ethanesulfonic acid, polystyrenesulfonic acid, and methanesulfonic acid) or the salts of such acids may be used. However, they do not normally provide the water or solvent durability that is provided by preferred co-reacted silanolsulfonate materials, i.e., simple sulfonic acids tend to migrate or be leached out of the cured conductive film. However, once the conductive polymeric film is overcoated with an abrasion resistant film, for example, the conductive polymeric film is relatively impervious to the leaching effects of water. Phosphonic acids with structures similar to those of the sulfonic acids described above are also useful.

The function of the preferred sulfonic acids is not only to provide sulfonate functionality, but also to serve as an acid in promoting the in situ exhaustive hydrolysis of any hydroxyl precursor, as described above, to its corresponding alcohol. Such hydrolytic processes may be exothermic and can be monitored by spectroscopic means, as for example, by infrared and nuclear magnetic resonance spectroscopies.

3. Optionally, an Acid Catalyst

Use of an acid catalyst is usually desirable particularly to afford hard, solvent resistant films. Any acid catalyst which speeds up the curing of the hydroxyorganosilane composition is useful. Useful acid catalysts include inorganic acids as, for example, sulfuric acid, nitric acid, phosphoric acid, antimony pentafluoride, antimony pentachloridedimethyl methylphosphonate (see U.S. Pat. No. 4,293,675), hexafluoroantimonic acid and such acidic organic materials as, for example, p-toluenesulfonic acid and other monomeric or polymeric sulfonic acids, bis(perfluoromethanesulfonyl)methane (see U.S. Pat. No. 2,732,398), higher homologs of such fluorinated sulfonyl methanes (see U.S. Pat. Nos. 3,281,472, 3,632,843 and 4,049,861), trifluoromethanesulfonic acid and higher perfluorinated homologs (see U.S. Pat. No. 4,049,861), and photoactivatable initiators such as, for example, triarylsulfonium hexafluoroantimonate and similar compounds (see U.S. Pat. No. 4,173,476). These catalysts can be present in concentration ranges from about 1 to about 5 weight percent based on the percent solids of the total reactive monomers. Hexafluoroantimonic acid hexahydrate is a preferred catalyst.

Substrates useful in the present invention are fibers, sheets and the surfaces of shaped solid objects. Among the preferred substrates are ceramic materials (e.g., glass, fused ceramic sheeting, fibers, and particulates such as silica), metals (e.g., sheets, fibers, aluminum, iron, silver, chromium, nickel, brass and other metals), metal oxides, thermoplastic resins (e.g., polymethyl methacrylate, polyethylene terephthalate, cellulose acetate and cellulose acetate butyrate), polycarbonates, polyamides and polyolefins (e.g., polystyrene, polyethylene and polypropylene), acrylic resins, polyvinyl chloride, polysilanes, polysiloxanes, thermoset resins, epoxy resins, paper, wood and natural resins (e.g., rubber, gelatin and silver halide-gelatin emulsions), textiles, foams, laminates, coated articles, and other organic and inorganic substrates, any surface of which may benefit from a coated conductive polymeric film.

When the substrate is not naturally adherent with the compositions of the present invention, the substrate may be primed first. Many primers are known in the art, and their purpose is to provide a layer to which the conductive film more readily adheres than to the original surface of the substrate. For example, in the photographic art, primers are generally used on the polyethylene terephthalate base to improve adhesion of subsequent layers thereto. A host of commercial primers such as polyvinylidene chloride, various aliphatic or aromatic urethanes, caprolactones, epoxies, and siloxanes can also find utility as primers for the films of the invention. The surface of the substrate may itself be modified to improve adherence.

Specific substrates used in the present invention include aluminum that was previously silicated, brass that was previously treated with a nitric acid-ferric chloride solution, polyethylene that was previously chromic acid etched [see J. R. Rasmussen, E. R. Stedronsky and G. M. Whitesides, J. Amer. Chem. Soc. 99, 4737 (1977)], polypropylene which is chromic acid etched or previously subjected to corona discharge, glass which is either first abraded with a scouring powder or etched with chromic acid, and cellulose acetate butyrate which is first treated with caustic (sodium hydroxide or potassium hydroxide). Polyvinylidene chloride-primed polyethylene terephthalate (commercially available from 3M) is a particularly suitable substrate used in this invention.

Additives which serve a given purpose such as viscosity modifiers, hardness modifiers, pigments, fillers, UV absorbers, colorants, leveling agents, and the like, may be added with proper mixing. A leveling agent which has been found useful in the practice of the present invention is Triton X-100 ®, octylphenoxypolyethoxyethanol (Rohm and Haas, Philadelphia, PA). Leveling agents are used in trace to minor amounts, e.g., 0.001 to 1.0 weight percent. Optional additives include numerous organosilane and organosiloxane monomers and oligomers, for example, methylsilanetriol oligomers, orthosilicates, and those materials represented by the formula:

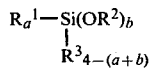

wherein $R^1$ and $R^2$ are defined above and $R^3$ is selected from alkyl groups having 1 to 6 carbon atoms or phenyl groups, a is 2 or 3, and b is 1 or 2, with the proviso that (a+b) is equal to 3 or 4. Additives may be added based on the percent solids of the reactive monomers and may vary from as little as 0.1 to as much as 20 percent or more. Epoxysilanes are particularly useful additives for the preparation of hard and abrasion resistant films. They may be used in amounts in the range of 0.1 to up to 95 weight percent of reactive monomers.

The pH range of these formulations can be from about 0.5 to about 11, depending upon the selection of components. Since there is a correlation between higher conductivity and lower pH, subsequent addition of basic additives to the preferred acidic formulations is limited so that the pH of the resulting coating formulation remains less than about 5, preferably less than about 3, and most preferably less than about 2. This also encourages a curing rate which is not excessively slow and also provides hard, solvent resistant films. Solvents may be added to adjust the viscosity of the uncured solution. These compositions are usually, and preferably, used shortly after they are prepared; however, they may be prepared and stored at room temperature or below for several days before application.

To prepare the composite structure of the present invention, solutions of the components of the coating composition, i.e., the organosilane hydrolyzate, the optional silanol-sulfonate and the optional acid catalyst are simply mixed or blended. This mixture is allowed to stand until exhaustive hydrolysis, where necessary, is complete. Heating may be required. The preferred order of addition of ingredients is to add the silanol-sulfonate to the silane.

The solution is applied to a substrate, which can be in the shape of a polymeric film, or a preformed article made of, for example, polyvinylidene chloride-primed polyethylene terephthalate, by dipping, brushing, spraying, knife coating, bar coating, and painting, or by any other suitable coating method. A coating method conveniently used in this invention employs RDS bar coaters (RD Specialties, Webster, NY) which allow the coating of resultant films of specified thicknesses. Cured coating thicknesses of about 0.1-25 microns are particularly useful, with a thickness in the range of about 1-10 microns being preferred. Where desired, thicker coatings can be applied.

The composition of the present invention coated on a substrate can be cured in situ by heat or microwave radiation which causes polymerization of the coated compositions of the present invention, and will provide hard, solvent resistant films provided such films are adequately dehydrated during the curing process.

The preferred method of curing these coatings is by application of heat with temperatures ranging from about 60°-120° C.; more preferably the temperature is in the range of about 80°-100° C. Higher or lower temperatures can be used. The duration of curing ranges from as short as about 2 minutes to as long as about 16 hours, with a preferred curing time of about 30 minutes at 90° C.

It is preferable that both radiation and heat be used to cure the coating compositions when a triphenylsulfonium hexafluoroantimonate or similar photoactivatable material is used, as described in U.S. Pat. No. 4,173,476. Neutral coating compositions containing photoactivatable catalysts have the advantage of longer shelf life than those containing added acidic materials. Any suitable source which emits actinic radiation and preferably ultraviolet radiation may be used to activate these catalysts in the practice of this invention. Suitable sources are mercury arcs, carbon arcs, low-, medium-, and high-pressure mercury lamps, plasma arcs, ultraviolet light emitting diodes, and ultraviolet emitting lasers. Typical cure conditions with such ultraviolet light sources involve the conveying, or repeated conveying, of an overcoated substrate several centimeters from the source of a 200 watt per 2.54 cm (1 inch) medium-pressure mercury vapor lamp preferably in a reflectorized housing for maximum radiation exposure with, optionally, a conveyor moving at a suitable speed, for example, 15 meters/minute (50 feet per minute).

Another convenient means of preparing cured polymeric compositions which incorporate the optional silanol-sulfonate salt of Formula IV involves the preparation of cured films comprising the silanol-sulfonic acids described above and subsequently replacing the proton of the sulfonic acid groups in the cured films by a desired cation. One method involves the ion-exchanging of the desired cation into a film by immersion of the cured film into a solution of a neutral or basic salt of the desired cation. Another method, for example, is to form protonated weak bases as the cationic species by reaction of the sulfonic acid groups in the cured film with a weak base having a $pK_a$ of less than about 11. Again, this may be accomplished by immersion of a cured film into a solution of the weak base. Conversely, by ion-exchange methods, silanol-sulfonate salt-containing films may be converted to silanol-sulfonic acid-containing films by immersion in protonic acid solution. Furthermore, the cations of the silanol-sulfonate salt-containing films may be interchanged.

It may be desirable to modify the surface of the cured polymeric conductive film by lowering its coefficient of friction and thereby imparting certain desirable handling qualities. This can be accomplished by applying, for example, fluorocarbons, release agents, or antiblocking agents to the film by methods such as those taught in U.S. Pat. No. 4,293,606.

Surprisingly, overcoating a first cured conductive film of this invention with another compatible film which itself is not conductive provides novel composite films of excellent conductivity. The first cured conductive film of the present invention may also be overcoated with a second similar or identical film within the present invention to afford a conductive composite structure having additional desirable properties, such as abrasion resistance. The second coating formulation or top coating may be selected so as to provide different conductive or other properties in the cured top layer.

Polymeric overcoatings which may be useful can be derived from a variety of silane monomers and their hydrolyzates (or their respective oligomers or polymeric forms, alone or in combination). Typical examples include:

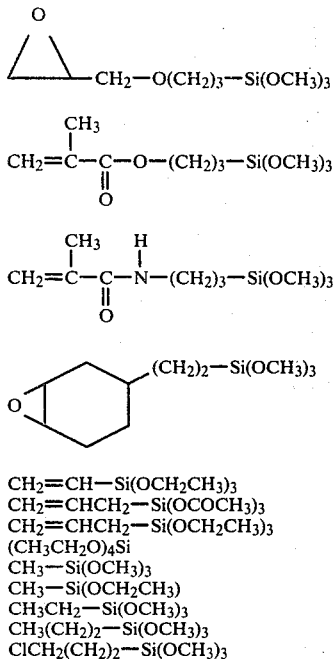

CH₂=CH—Si(OCH₂CH₃)₃
CH₂=CHCH₂—Si(OCOCH₃)₃
CH₂=CHCH₂—Si(OCH₂CH₃)₃
(CH₃CH₂O)₄Si
CH₃—Si(OCH₃)₃
CH₃—Si(OCH₂CH₃)
CH₃CH₂—Si(OCH₃)₃
CH₃(CH₂)₂—Si(OCH₃)₃
ClCH₂(CH₂)₂—Si(OCH₃)₃

Methods of coating and the subsequent acid catalyzed curing of these silane materials to produce cured siloxane films are described in the art. They may be applied from organic solvents or water and may be modified by the incorporation of various additives such as viscosity modifiers, pigments, fillers, UV absorbers, colorants, leveling agents and the like.

The coating and overcoating compositions may be applied to a substrate or to a previously prepared conductive polymeric film coated substrate by dipping, brushing, spraying, knife coating, bar coating, painting, or by any other suitable coating method. The coating method conveniently used in this invention employs RDS bar coaters (RD Specialties, Webster, NY) which allows for the coating of compositions of specified thicknesses. The coating thickness of the overcoating composition depends on the use of the desired composite film. The practical upper limit of thickness of the overcoated film depends on the nature of its construction and requires that the resultant composite structure remains intact after curing.

Curing of the overcoating composition can be accomplished in situ by employing any energy source appropriate to the specific monomer or monomers present.

It has been found, surprisingly, that when, for example, a polyvinylidene chloride-primed polyethylene terephthalate substrate having a conductive polymeric film thereon has an overcoated abrasion resistant polymeric film derived from acid catalyzed curing of gamma-glycidoxypropyltrimethoxysilane (see Example I below), the resultant composite polymeric film still exhibits good conductivity. It has been found, further, that the conductivity of such composites is essentially independent of the thickness of the abrasion-resistant overcoated polymeric film, within practical coating capabilities. Furthermore, the abrasion-resistance of these composite films is excellent, as indicated by abrasion-resistance haze tests.

Additional overcoatings which may be employed in the practice of this invention include numerous surface-modifying siloxane coatings, for example, release coatings, adhesives, and protective coatings which are well documented in the art. See, for example, U.S. Pat. Nos. 4,049,861, 4,225,631, 4,239,798 and 4,223,121 which relate to abrasion resistant coatings, and U.S. Pat. No. 3,986,997 which discloses pigment-free coating compositions. U.S. Pat. No. 4,239,798 describes a silicone coated polycarbonate article and U.S. Pat. No. 4,101,513 discloses a catalyst for condensation of hydrolyzable silanes and storage stable compositions thereof. U.S. Pat. No. 4,294,950 relates to a coating composition comprising hydrolyzates from silane compounds.

Many of the characteristics of these polymeric films combine to provide materials with unique and useful properties. During normal use, these films may come in contact with water or abrasive materials or both. The films of this invention show excellent durability with respect to water washing or abrading with steel wool. In most instances, the abrasion resistance is superior to that of the uncoated substrate. In composite films, wherein the top layer is a cured siloxane abrasion resistant layer, the hardness may be such that the conductive cured coatings are scratched with steel wool only with difficulty. A quantitative measure of this surface hardness is a film's resistance to abrasion by falling sand.

Conductivity of the films is readily apparent in their excellent antistatic properties. Surface charges cannot only damage electrical components, but also may attract contaminants such as dust and smoke particles. When buffed with a tissue, for example, the surfaces of films of this invention do not attract small pieces of tissue, paper, cigarette ashes or polystyrene, even down to very low humidities. Static decay times (as shown in examples below) illustrate the reluctance of films to develop or maintain static charges.

Films particularly useful are those having silanol-sulfonates or sulfonato functional organic compounds since they resist fogging. For example, such films, when breathed on, resist fogging, even if they are initially cooled by refrigeration.

The ion exchange characteristics of those polymeric films containing the silanol-sulfonato component allow easy, rapid tinting, even at room temperature. By simple ion exchange of the sulfonato groups with the appropriate cationic dye, such films may be selectively colored to almost any optical density by immersion of the cured coating into a solution of the dye.

The cured conductive compositions of the present invention are useful as coatings in composite structures as well as self-supporting cured conductive films. The cured compositions dissipate charges, provide conductive surfaces in imaging technology, serve as a ground plane, may prevent fogging, and may exchange and bind ions. They are useful with any compatible film or material which might benefit from the use of a conductive sub- or under-layer to dissipate or transport electronic charge. Examples of such films or materials are adhesives, gelatins, photoemulsions, photoconductive materials and dielectric materials.

Evaluation of various physical properties of the cured compositions of the present invention were made. In the evaluation of surface resistivity, razor blades were used as flexible electrodes and made excellent contact with the polymeric films. The blades were connected to an insulating polymer platform and were attached by use of spring loaded clamps to insure intimate contact with the substrate surface. The configuration was such that the edges of the blades were diametrically opposed and, thus, described a square-shaped area of approximately 16 cm². Electrical contact was made by attachment with coaxial cable from a Keithley 600A electrometer (Keithley Instruments, Inc., Cleveland, OH) to the metallic spring clamps holding the blades.

Conductivity measurements are sometimes made at ambient relative humidity. To demonstrate the superior performance of the films of this invention under adverse conditions, they were often evaluated at low relative humidity. The electrodes of the electrometer and the sample were kept in an enclosed chamber which had therein a material (see examples of useful materials in "Lange's Handbook of Chemistry", J. A. Dean, Editor, McGraw-Hill Publishers, New York (1973) 11th Edition, page 10-79) which provided a specified relative humidity at a given temperature under the equilibrium conditions of a closed vessel.

In the static decay evaluation, a sample of the film was charged up to 5000 volts, grounded, and the time it took to discharge to 500 volts, was measured. Military specifications (MIL-B-81705) presently accept for static protection any film that exhibits a static decay time of two seconds or less.

The abrasion resistance of polymeric films was measured by the film's resistance to abrasion by falling sand. One liter of sand 20 to 30 mesh, ASTM Designation C190-77, (Ottawa Silica Co., Ottawa, IL) was dropped through an abrasion tester instrument and the falling sand was allowed to impinge onto a film surface whose haze or light transmitting properties were measured before and after abrasion with sand using a Gardner Hazemeter as described in ASTM Method D1003-61 (1977).

Objects and advantages of this invention are further illustrated by the following examples, but the particular materials and amounts thereof recited in these examples, as well as other conditions and details, should not be construed to unduly limit this invention. Parts and percentages are by weight unless otherwise indicated, and temperatures are in degrees centigrade. In the following examples, compositions that lead to conductive polymeric films were applied to substrates using an RDS Bar Coater No. 14, and overcoatings of abrasion resistant compositions were applied to conductive polymeric film-coated substrates using an RDS Bar Coater No. 8 (commercially available from RD Specialties, Webster, NY) unless indicated otherwise. All resistance measurements were made with a Keithley Instruments 600A electrometer (Keithley Instruments, Inc., Cleveland, OH). All resistivities are surface resistivities unless otherwise stated and are given for equilibrated samples at the relative humidity specified.

EXAMPLE 1

Conductive polymeric films were evaluated for surface resistivity (or conductivity) using ASTM Method D257-78 as the model, and for static decay using Federal Test Method Standard No. 101, Test Method No. 4046 as the model. The polymeric films were prepared from a coating formulation comprising a mixture of a hydrolyzate solution of gamma-glycidoxypropyltrimethoxysilane (which solution is hereinafter referred to as A), with a silanol-sulfonic acid solution derived from gamma-glycidoxypropyltrimethoxysilane (which solution is hereinafter referred to as B) wherein the ratio of the two components of this mixture were varied as is indicated in samples 1-5 of Table I.

The hydrolyzate solution, A, of gamma-glycidoxypropyltrimethoxysilane was prepared by agitation of a mixture of 20 g of this monomer with 10 g of water for about 90 minutes at ambient temperature.

Solution B, the silanol-sulfonic acid solution derived from gamma-glycidoxypropyltrimethoxysilane, was prepared by slowly adding a solution of 29.5 g of gamma-glycidoxypropyltrimethoxysilane in 14.75 g of water to a solution of 15.75 g of sodium sulfite and 40 g of water. The mixture was stirred and reacted at 50° C. for 16 hours. The pH of the resulting reaction mixture was 12.8. The solution was passed through an excess of the acid form of Amberlite®IR-120 (ion exchange resin, Rohm and Haas Company, Philadelphia, PA). This provided a solution having a pH of less than 1. The solution was adjusted to 23 percent solids by weight by addition of water.

In a typical sample formulation, 3 g of A was combined with 1.5 g of B and the resulting solution was allowed to stand at room temperature until any exotherm subsided (about 10-15 minutes, see below). To this solution was added 2 ml of methanol, a few drops of a 10 percent solution of Triton X-100, and 40 mg (1-2 percent by weight) of hexafluoroantimonic acid hexahydrate. This formulation was coated on polyvinylidene chloride-primed polyethylene terephthalate using a No. 14 RDS Bar Coater. The resultant coating was then cured at 90° C. for at least 30 minutes to give the polymeric film.

The cationic methylene blue dye absorbance evaluation utilized a piece (1 cm×1 cm×about 7 microns thick) of polymeric composite film, whose composition is described below. The film sample was immersed in 0.01M aqueous methylene blue (as the chloride) for 15, 30, or 60 seconds, then rinsed with distilled water, and placed in a Beckman DB spectrophotometer where the absorbance was measured at a wavelength of 655 nanometers (nm). A higher absorbance indicates the presence of a larger number of sulfonate groups which bind the methylene blue.

TABLE I gives composition, resistivity, methylene blue absorbance, and static decay data for samples 1 to 5.

TABLE I

Studies of Polymeric Films Derived from Glycidoxypropyltrimethoxysilane

| Sample No. | Silane-containing materials | | | Resistivity[a] (ohms/square) | Methylene blue absorbance[b] | | | Static decay[c] (sec) | |
|---|---|---|---|---|---|---|---|---|---|
| | A Wt. (g) | B Wt. (g) | Wt. Ratio A/B | | 15 sec. | 30 sec. | 60 sec. | Initial | Stored (11 days) |
| 1[d] | 3.0 | 0.5 | 6 | greater than $10^{13}$ | 0.05 | 0.05 | 0.06 | 0.24 | 0.35 |
| 2 | 3.0 | 1.0 | 3 | $10^{9e}$ | 0.24 | 0.30 | 0.40 | 0.04 | 0.06 |
| 3 | 3.0 | 1.5 | 2 | $10^{8}$ | 0.99 | 1.28 | 1.67 | 0.06 | 0.05 |
| 4 | 3.0 | 2.0 | 1.5 | $10^{8}$ | 1.31 | 1.64 | 2.03 | 0.05 | 0.04 |

TABLE I-continued

Studies of Polymeric Films Derived from Glycidoxypropyltrimethoxysilane

| Sample No. | Silane-containing materials | | | Resistivity[a] (ohms/square) | Methylene blue absorbance[b] | | | Static decay[c] (sec) | |
|---|---|---|---|---|---|---|---|---|---|
| | A Wt. (g) | B Wt. (g) | Wt. Ratio A/B | | 15 sec. | 30 sec. | 60 sec. | Initial | Stored (11 days) |
| 5 | 3.0 | 3.0 | 1 | $10^8$ | 1.45 | 1.83 | 2.16 | 0.05 | 0.04 |

[a] measured at relative humidity of 28%; control polyester film had a resistivity greater than $10^{14}$ ohms/square
[b] control films prior to exposure to methylene blue had an absorbance of 0.05 at 655 nm
[c] film stored and tested at 7% relative humidity; static decay time of control polyester substrate was too long for practical measurements (longer than minutes)
[d] when the coating solution was heated for 1 hour at 60° C., ensuring exhaustive hydrolysis, conductivity of the cured film was 4.3 × $10^9$ ohm/square at 25 percent relative humidity
[e] at 25° C., this material had a dielectric constant of 95 and a volume resistivity of 1.3 × $10^9$ ohm-cm at 24° C. and 10 volts; exhaustive hydrolysis of epoxide by reaction of component A with B was indicated by NMR spectroscopy The flexible, hard, transparent films of the invention possessed excellent antifogging and antistatic properties and readily exchanged cationic material. Evolution of heat (exotherm) was usually noted when epoxy-containing compounds such as gamma-glycidoxypropyltrimethoxysilane and sulfonic acids were combined in these coating formulations and external heat was not required. It was found that if this exotherm was moderated by cooling with an ice bath, for example, and this coating formulation was then cured, the resultant films were less conductive and exhibited higher abrasion resistance than those films prepared from coating formulations whose exotherms were not moderated.

The data of Table I show:

(1) a range of silanol-sulfonic acid concentrations are useful in producing conductive films;
(2) increased amounts of sulfonate in the films allow for increase in conductivity and for an increase in ion-exchange capacity;
(3) the static decay performance of the films is not affected by storage under dehydrating conditions; and
(4) exhaustive hydrolysis is necessary to generate films of low surface resistivity and may be promoted by heating if there is no spontaneous exotherm upon combination of A and B (see sample 1, footnote "d").

EXAMPLE 2

The conductivities of polymeric films having varying amounts of hydroxyorganosilane monomer components were compared.

The exhaustive hydrolysis product of gamma-glycidoxypropyltrimethoxysilane [gamma-(beta,gamma-dihydroxypropoxy)-propylsilanetriol] was prepared by one day room temperature stirring of a mixture of 60 ml of 1 percent aqueous sulfuric acid with 40 g of gamma-glycidoxypropyltrimethoxysilane (A-187, Union Carbide, New York, NY). Conventional organic functional group tests for epoxide and diol groups were consistent with the expected structures. The pH of this solution was raised to about 6 by the addition of calcium carbonate, followed by filtration through diatomaceous earth. The resulting clear filtrate was 22 percent diol (solids) and was used in samples 6-10 of TABLE II below.

Coating formulations were prepared according to the formulations in TABLE II by adding to the requisite amount of dihydroxyorganosilanol solution prepared above, the corresponding amount of A (EXAMPLE 1), water, a few drops of a 10 percent solution of Triton X-100, and a few drops of hexafluoroantimonic acid hexahydrate as the acid catalyst. To insure that there was no appreciable hydrolysis of the epoxy function of the epoxy functional silane to its diol derivative, the acid catalyst was added immediately prior to coating the resultant formulation onto polyvinylidene chloride-primed polyethylene terephthalate. The coating was cured at 90° for 30 minutes.

TABLE II

Resistivity of Films from Diol- and Epoxy-Containing Monomers

| Sample no. | Diol wt. (g) | A wt. (g) | Water added (g) | Approximate mole ratio diol/epoxy | Surface Resistivity of polymeric film (ohms/square)[a] |
|---|---|---|---|---|---|
| 6 | 4.5 | 0 | 0 | | $1.6 \times 10^9$ |
| 7 | 4 | 0.18 | 0.32 | 6.8 | $5 \times 10^9$ |
| 8 | 3 | 0.57 | 1 | 1.8 | $6 \times 10^{10}$ |
| 9 | 2 | 0.84 | 1.7 | 0.7 | $5 \times 10^{12}$ |
| 10[b] | 0 | 1.5 | 3 | 0 | greater than $10^{13}$ |

[a] resistivity measured at 32 percent relative humidity (R.H.)
[b] control

The data of TABLE II show that if the epoxide function of glycidoxypropyltrimethoxysilane is first converted to the diol derivative followed by silane polymerization during curing, the resultant polymeric film exhibits good conductivity (sample 6). By contrast, if the epoxide function of this monomer is not allowed to form the diol, the cured film (control) shows poor conductivity (sample 10). These experiments clearly illustrate that hydroxyalkyl functionality is important in imparting good conductivity to the cured film. Furthermore, the desired conductivity of the conductive polymeric film can be dictated by choosing the proper ratio of diol derivative to epoxide containing silane (samples 6-9). In sum, increasing the concentration of hydroxyorganosilane monomer within the conductive polymeric film results in an increase in the conductivity of that film.

EXAMPLE 3

The preparation and use of gamma-hydroxypropylsilanetriol as a conductive polymeric film is shown.

Sodium methoxide solution was prepared by adding 2.3 g of metallic sodium to 100 ml of anhydrous methanol. To the room temperature solution was added 22.2 g of gamma-acetoxypropyltrimethoxysilane and the resultant mixture was stirred at room temperature for 22 hours and then concentrated to a small volume under reduced pressure. To the residue was added 50 ml of water and the product was stirred for three hours at room temperature. This solution was neutralized by ion exchange by passage through a column of Amberlite IR 120 (in the acid form) to afford a solution of gamma-hydroxypropolysilanetriol at about 7% solids, whose volume was reduced (by concentration under reduced pressure using a rotary vacuum evaporator) to afford a solution which was about 21% solids. This solution, 5 g, was combined with Triton X-100 and hexafluoroantimonic acid hexahydrate as described in EXAMPLE 1. The resultant formulation was coated (RDS Bar Coater No. 24) onto polyvinylidene chloride-primed polyethylene terephthalate substrate and cured at 90° C. for 30 minutes. The cured polymeric film had a surface resistivity of $1.5 \times 10^{10}$ ohms/square at 22 percent relative humidity. Note that films prepared from gamma-acetoxypropyltrimethoxysilane without prior exhaustive hydrolysis of the acetoxy function are not conductive.

EXAMPLE 4

This example is a study of the correlation between pH and surface resistivity.

The acidic solution of the exhaustive hydrolysis product of gamma-glycidoxypropyltrimethoxysilane (described in EXAMPLE 2 above) was titrated to pH values between 1.5 and 11.0 with barium hydroxide. These diol solutions were coated, cured and the surface resistivities of the resulting films were measured at 25 percent relative humidity. Results showed that film derived from diol solutions of pH 5.0 and above had surface resistivities of about $10^{11}$ ohms/square, while films derived from diol solutions of lower pH exhibited better conductivities. For example, the cured film derived from the diol solution of pH 1.5 had a surface resistivity of $4.8 \times 10^{8}$ ohms/square and the cured film derived from the diol solution of pH 3.0 had a surface resistivity of $1.4 \times 10^{10}$ ohms/square.

EXAMPLE 5

Samples were prepared using essentially the formulations of EXAMPLE 1, except that 0.1 percent by weight of a silica filler (Syloid ®308, Davison Chemical Co.) was added to the formulations and coated at different thicknesses using RDS Bar Coater Nos. 3, 8, and 14. Resistivity data showed that the electrical behavior of filler and non-filler containing polymeric films of different thicknesses was essentially the same.

EXAMPLE 6

The static decay of portions of film sample 3 of EXAMPLE 1 above was measured and compared with that of a commercial film. The static decay time (in seconds) of the sample was determined by charging the sample to 5000 volts and measuring the time in seconds to decay to 500 volts and the results are tabulated in Table III.

TABLE III

Static Discharge Properties of Films

| Sample no. | Percent relative humidity of films at 24° C. | Static decay (in sec.)$^a$ of stored samples | | | | |
|---|---|---|---|---|---|---|
| | | Initial testing | 1 week | 2 weeks | 3 weeks | 1 month |
| 11$^b$ | 7 | 0.17 | 0.32 | 0.75 | 0.86 | 0.86 |
| 12$^c$ | 7 | 0.04 | 0.04 | 0.03 | 0.03 | 0.04 |
| 13$^b$ | 20 | 0.13 | 0.23 | 1.1 | 3.2 | 5.7 |
| 14$^c$ | 20 | 0.04 | 0.04 | 0.04 | 0.04 | 0.04 |
| 15$^b$ | 50 | 0.14 | 0.22 | 2.0 | 16.7 | 25.2 |
| 16$^c$ | 50 | 0.04 | 0.04 | 0.04 | 0.05 | 0.05 |
| 17$^b$ | 75 | 0.11 | 0.17 | 1.54 | 6.0 | 11.9 |
| 18$^c$ | 75 | 0.05 | 0.04 | 0.04 | 0.05 | 0.04 |
| 19$^b$ | Saturated | 0.18 | 0.85 | 12.3 | 43.0 | 19.7 |
| 20$^c$ | Saturated | 0.05 | 0.04 | 0.05 | 0.05 | 0.06 |

$^a$measured at 7% relative humidity, 24° C.
$^b$control is Richmond film RCAS 1200 (Richmond Corporation, Redlands, CA)
$^c$present invention film The data of TABLE III show that the conductive polymeric films of the present invention maintain their static decay properties and outperform a state of the art material.

EXAMPLE 7

Polymeric films were prepared identical to sample 2 of EXAMPLE 1, except that catalytic amounts (i.e., 2 to 3 weight percent of the silane) of the following acid catalysts were included:

(1) hexafluoroantimonic acid hexahydrate (2) $(CF_3SO_2)_2CHC_6H_5$ (disclosed in U.S. Pat. No. 4,049,861)

(3) trifluoromethanesulfonic acid The formulations were evaluated, after heat curing, as to surface resistivity and static decay by methods described above. The data show that the conductive polymeric films of the present invention have excellent surface conductivity and exhibit excellent static decay independent of the acid catalyst used in the films' construction.

A photoactivatable initiator was used as an acid catalyst in a film prepared as in EXAMPLE 2 but having 1 percent by weight of triphenylsulfonium hexafluoroantimonate (U.S. Pat. No. 4,173,476) added to 2 g of 22 percent (in water) hydrolyzed diol, gamma-(beta,gamma-dihydroxypropoxy)propylsilanetriol, containing 1 ml of isopropyl alcohol with 0.5 percent Triton X-100. This formulation was coated (RDS Bar Coater No. 14) onto polyvinylidene chloride-primed polyethylene terephthalate substrate and cured for one minute with a medium-pressure Hanovia ultraviolet lamp (Hanovia Lamp Division, Canrad-Hanovia, Inc., Newark, NJ). The resulting tack-free composite exhibited a surface resistivity of $5.8 \times 10^{8}$ ohms/square at 58 percent relative humidity and $1.5 \times 10^{10}$ ohms/square at 7 percent relative humidity. This tack-free composite could be thermally cured thereafter to improve film hardness if desired.

EXAMPLE 8

Different silanol-sulfonic acids were used with A (see EXAMPLE 1) to give coatings according to the following procedure.

A coating formulation was prepared according to the method of EXAMPLE 1 by mixing 3 g of A with 1 g of selected silanol-sulfonic acid as indicated in Table VI. The silane was used at 67 percent solids and the silanol-sulfonic acid was used at 23 percent solids. After the exotherm had subsided, Triton X-100 and hexafluoroantimonic acid hexahydrate were added as in EXAMPLE 1 and the well-mixed coating formulation was coated with an RDS Bar Coater No. 14 onto primed polyethylene terephthalate substrate. The coating was cured to a hard polymeric conductive film by heating in an oven at 90° C. for 30 minutes. Resistivities of the resultant films (samples 21 to 26) were measured at 9 percent relative humidity and the results are summarized in Table IV.

TABLE IV

Resistivity of Films Using Various Silanol-Sulfonic Acids

| Sample no. | Silane chemical structure | Source[a] | Film surface resistivity (ohms/square) |
|---|---|---|---|
| 21 | HO$_3$SCH$_2$CHCH$_2$OCH$_2$CH$_2$CH$_2$Si(OH)$_3$[b] with OH on the CH | Ex. 1, 2 | $3.0 \times 10^{10}$ |
| 22 | HO$_3$SCH$_2$CH$_2$—Si(OH)$_2$—CH$_2$CH$_2$SO$_3$H | Ex. 7 | $2.6 \times 10^9$ |
| 23 | HO$_3$SCH$_2$—C$_6$H$_4$—Si(OH)$_3$ | Ex. 9 | $2.4 \times 10^{11}$ |
| 24 | HO$_3$SCH$_2$CH$_2$Si(OH)$_3$ | Ex. 3 | $7.5 \times 10^9$ |
| 25 | HO$_3$SCH$_2$CH$_2$CH$_2$Si(OH)$_3$ | Ex. 5 | $4.7 \times 10^{10}$ |
| 26 | HO$_3$SCH$_2$CH$_2$CH$_2$SCH$_2$CH$_2$CH$_2$Si(OH)$_3$ | Ex. 6 | $8.0 \times 10^{12}$ |

[a]example numbers in this column refer to that example in the U. S. Pat. No. 4,235,638
[b]represents a control; prepared as described in Example 1

The data of TABLE IV show that a variety of silanol-sulfonic acids may be used to prepare conductive films of the present invention.

EXAMPLE 9

Films prepared as in EXAMPLE 1 but having 3 g of A reacted with organic sulfonic acids (listed below) were evaluated as to resistivity, then rinsed with about 100 ml of deionized water, which was applied as a fine stream onto the film's surface, air dried, and again evaluated as to resistivity. The results indicate that coating and curing of formulations containing organic sulfonic acids as additives produced polymeric conductive films of acceptable resistivity. However, when these films were contacted with water, the films exhibited lower conductivity. These noncopolymerizable organic sulfonic acid additives exhibited solvent sensitivity due to their water leachability from, and mobility in, the resultant polymeric films. In contrast, the coreacted silanol-sulfonic acid-containing films exhibit excellent solvent resistance.

The organic sulfonic acids used were

CH$_3$CH$_2$SO$_3$H

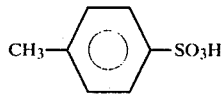

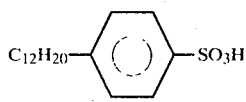

HOCH$_2$CHCH$_2$SO$_3$H
    |
    OH

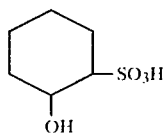

EXAMPLE 10

Samples 27 to 40 illustrate the use of different silanol-sulfonate salts as components in formulations to give polymeric conductive films.

A coating formulation was prepared according to the method of EXAMPLE 1 by mixing 3 g of A with 1 g of B. After the resultant exotherm had subsided, the acidic solution (pH about 1) was diluted with 2 ml of water (samples 33 to 39) or not diluted (samples 27 to 32, and 40) and titrated with a base whose cation is indicated in Table V. In these examples, a strong base was used and the salt-forming titration was stopped when the pH was between 4.0 and 4.5. To 4 g of the resulting solution was added 2 ml of methanol (samples 27 to 32, and 40) or no methanol was added (samples 33 to 39), 3 drops of 10 percent Triton X-100 in water, and 3 drops of hexafluoroantimonic acid hexahydrate. The coating formulation was coated onto polyvinylidene chloride-primed polyethylene terephthalate substrate using an RDS Bar Coater No. 14, and the coating was cured in an oven at 90° for 30 minutes. The results are shown in TABLE V.

TABLE V

Resistivity of Films Containing Various Silanol-Sulfonate Salts

| Sample no. | Cation[a] | pH[b] | Surface Resistivity (ohms/square) 9% R.H. | 58% R.H. |
|---|---|---|---|---|
| 27 | (HOCH$_2$CH$_2$)$_4$N$^+$ [a1] | 5.3 | $1.4 \times 10^{10}$ | $7.8 \times 10^7$ |
| 28 | (C$_6$H$_5$CH$_2$)(CH$_3$)$_3$N$^+$ [a2] | 5.3 | $6.6 \times 10^8$ | $1.0 \times 10^8$ |
| 29 | (CH$_3$)$_4$N$^+$ [a3] | 5.0 | $2.5 \times 10^{10}$ | $1.2 \times 10^8$ |
| 30 | (n-C$_4$H$_9$)$_4$N$^+$ [a4] | 5.3 | $1.8 \times 10^{10}$ | $2.0 \times 10^8$ |
| 31 | Na$^+$ [a5] | 5.3 | $7.0 \times 10^9$ | $8.6 \times 10^7$ |
| 32 | Ba$^{++}$ [a6] | 5.0 | $1.2 \times 10^{11}$ | $7.6 \times 10^8$ |
| 33 | Mg$^{++}$ [a7] | 5.0 | $4.1 \times 10^{10}$ | $2.8 \times 10^{8c}$ |
| 34 | Zn$^{++}$ [a8] | 5.0 | $5.0 \times 10^{10}$ | $4.3 \times 10^{8c}$ |
| 35 | Ni$^{++}$ [a9] | 5.5 | $1.0 \times 10^{11}$ | $8.8 \times 10^{8c}$ |
| 36 | Co$^{++}$ [a10] | 4.0 | $4.4 \times 10^{10}$ | $4.8 \times 10^{8c}$ |
| 37 | Cu$^{++}$ [a11] | 4.5 | $3.0 \times 10^{10}$ | $2.8 \times 10^{8c}$ |
| 38 | Pb$^{++}$ [a12] | 4.0 | $8.4 \times 10^9$ | $1.0 \times 10^{8c}$ |
| 39 | Cd$^{++}$ [a13] | 4.3 | $2.8 \times 10^{10}$ | $2.4 \times 10^{8c}$ |

TABLE V-continued

Resistivity of Films Containing Various Silanol-Sulfonate Salts

| Sample no. | Cation[a] | pH[b] | Surface Resistivity (ohms/square) 9% R.H. | 58% R.H. |
|---|---|---|---|---|
| 40[d] | H+ | 1.0 | $1.3 \times 10^9$ | $4.7 \times 10^8$ |

[a]acidic solution titrated with the following bases:
[a1]90 percent (HOCH$_2$CH$_2$)$_4$N$^+$OH$^-$ in water (RSA Corp., Ardsley, NY)
[a2]40 percent (C$_6$H$_5$CH$_2$)(CH$_3$)$_3$N$^+$OH$^-$ in methanol (Aldrich Chemical Co., Milwaukee, WI)
[a3]20 percent (CH$_3$)$_4$N$^+$OH$^-$ in methanol (Aldrich Chemical Co.)
[a4]25 percent (n-C$_4$H$_9$)$_4$N$^+$OH$^-$ in methanol (Eastman, Rochester, NY)
[a5]25 percent sodium hydroxide in water
[a6]saturated barium hydroxide in water
[a7]solid magnesium hydroxide
[a8]solid zinc carbonate
[a9]solid nickel carbonate
[a10]solid cobalt carbonate
[a11]solid copper carbonate
[a12]solid lead carbonate
[a13]solid cadmium hydroxide
[b]pH measured after titration and prior to addition of surfactant and acid catalyst
[c]measured at 53 percent relative humidity
[d]control The data show that a variety of silanol-sulfonate salts may be used to produce conductive polymeric films.

EXAMPLE 11

An organosilane-phosphonic acid was prepared according to the procedure of G. H. Barnes and M. P. David, *J. Org. Chem.*, 25, 1191 (1960). Hydrolysis of 1 g of dimethyl triethoxysilylethylphosphonate in 5 g of refluxing concentrated HCl for 23 hours affords, after evaporation of solvent, the solid siloxane phosphonic acid.

A coating solution was prepared by combining 1.0 g of a 20% aqueous solution of the organosilane-phosphonic acid with 2.0 g of a 10% aqueous solution of [gamma-(beta, gamma-dihydroxypropoxy)-propyl-silanetriol] of Example 2.

A cured film on polyvinylidene chloride-primed polyethylene terephthalate was prepared according to the procedure of EXAMPLE 1.

The film was flexible, hard, transparent, antifogging, and cation-exchangeable. Surface resistivity of the cured film was $3.8 \times 10^{10}$ ohms/square at 12% relative humidity.

The results show that silane phosphonates are also useful in the practice of this invention.

EXAMPLE 12

Cured films coated on polyvinylidene chloride-primed polyethylene terephthalate, prepared as described in EXAMPLE 4, were subjected to cation exchange (cations used were Na$^+$, Ag$^+$, Mg$^{+2}$, Cu$^{+2}$, Mn$^{+2}$, Fe$^{+3}$, Cr$^{+3}$, methylene blue cation, C$_6$H$_5$CH$_2$(C$_6$H$_5$)$_3$P$^+$, C$_6$H$_5$CH$_2$(C$_2$H$_5$)$_3$N$^+$, (n—C$_4$H$_9$)$_4$N$^+$, and (NH$_2$)$_2$C=NH$_2^+$. Cations used were exchanged into the silanol-sulfonic acid-containing films and the resulting films showed excellent conductivity.

EXAMPLE 13

A pressure sensitive, conductive film-containing tape which can be dispensed according to length to overcome a problem of charge generation, was prepared.

The coating formulation of sample 2, TABLE I above, was prepared according to the method of EXAMPLE 1. This formulation was coated onto polyvinylidene chloride-primed polyethylene terephthalate substrate and the coating was cured to yield a conductive polymeric film. The top, conductive surface of this film was overcoated (using a RDS Bar Coater No. 3) with a release coating composition such as a low adhesion backsize.

The pressure sensitive adhesive (such as a water-based acrylate) was next applied (using RDS Bar Coater No. 8) to the remaining, uncoated, suitably primed surface of the substrate. The resultant conductive composite tape may be affixed, e.g., by applying finger pressure, to a non-conducting surface to provide protection against static charge generation. The resistivity of this tape was determined to be about $4.5 \times 10^{10}$ ohms/square at 19 percent relative humidity. A control film of the release coating, prepared using RDS Bar Coater No. 3 and cured at 90° for five minutes, had a resistivity of greater than $10^{13}$ ohms/square at 19 percent relative humidity, and a control film of the pressure sensitive adhesive, prepared using RDS Bar Coater No. 8 and cured at 90° for ten minutes, had a resistivity of greater than $10^{13}$ ohms/square at 19 percent relative humidity. The polyester substrate also had a resistivity of greater than $10^{13}$ ohms/square at this relative humidity.

EXAMPLE 14

A substrate-supported conductive film overcoated with a pressure sensitive adhesive was prepared.

The substrate-supported conductive polymeric film was prepared exactly as described in the EXAMPLE 12. This composite was overcoated with a pressure sensitive adhesive (i.e., a water-based acrylate) (using RDS Bar Coater No. 8) to give a conductive composite. The surface resistivity, measured on the adhesive side, was $4.8 \times 10^9$ ohms/square at 58 percent relative humidity and $2.2 \times 10^{10}$ ohms/square at 9 percent relative humidity.

EXAMPLE 15

Samples 41 to 50 demonstrate the capability of constructing composite polymeric films having a substrate, a conductive polymeric film, and an overcoating of an abrasion resistant polymeric film wherein the thicknesses of the films of the composite may be the same or different.

A base coating formulation, that on curing yielded a conductive polymeric film, was prepared as detailed in EXAMPLE 1, sample 1. The proportions of A to B in the samples were as specified in TABLE VI. Hydrolyzate solution A (see EXAMPLE 1) was a 67 percent solution, and silanol-sulfonic acid solution B (see EXAMPLE 1) was a 23 percent solution.

An overcoating formulation that on curing yielded an abrasion resistant polymeric film (ARC, see footnote e, Table VI) was prepared according to the method of EXAMPLE 1 by adding to 6 g of A 4 ml of methanol, a few drops of hexafluoroantimonic acid hexahydrate as the acid catalyst, and a few drops of a 10 percent ethyl acetate solution of a fluorochemical acrylate copolymer (see Ex. 1, U.S. Pat. No. 3,787,351) as the leveling agent.

A polyvinylidene chloride-primed polyethylene terephthalate substrate was coated with the above base coating formulation. The coated substrate was cured at 90° for 30 minutes, and after equilibration of the film under ambient conditions for the appropriate period of time, the film was overcoated with the overcoating formulation designated in Table VI with RDS Bar Coater No. 14, unless otherwise specified. The overcoated material was then cured at 90° for 30 minutes.

Both the conductivity and the haze measurements on these composite films were measured and recorded in Table VI.

TABLE VI

Resistivity and Abrasion Resistance of Composite Polymeric Films

| | Coating formulation | | Composite polymeric film | | | |
|---|---|---|---|---|---|---|
| Sample no. | Base coating[a] (A:B) | Over-coating[b] (A:B) | Surface Resistivity (ohms/square) | Percent R.H. | Abrasion resistance (percent haze) Before | After[c] |
| 41[e] | 3:5 | none | $2.8 \times 10^7$ | 33 | 0.6 | 54.4 |
| 42[e] | 3:12 | none | $7.6 \times 10^7$ | 25 | 1.3 | 79.1 |
| 43[e] | 3:21 | none | $3.0 \times 10^7$ | 25 | 1.0 | 78.3 |
| 44 | 3:5 | 3:1[a] | $2.9 \times 10^7$ | 28 | 0.4 | 20.9 |
| 45 | 3:12 | 3:1[a] | $2.0 \times 10^7$ | 25 | 0.6 | 19.9 |
| 46 | 3:21 | 3:1[a] | $2.0 \times 10^7$ | 25 | 0.9 | 20.2 |
| 47[e] | None | ARC[d] | greater than $10^{13}$ | 33 | 0.4 | 9.6 |
| 48 | 3:5 | ARC | $3.0 \times 10^8$ | 33 | 0.4 | 5.8 |
| 49 | 3:15 | ARC | $2.5 \times 10^{10}$ $2.0 \times 10^{11}$ | 25 9 | 0.3 | 4.0 |
| 50 | 3:21 | ARC | $1.6 \times 10^{10}$ $2.0 \times 10^{11}$ | 25 9 | 0.5 | 5.2 |

[a]A:B represents ratio of A to B as prepared in EXAMPLE 1
[b]RDS Bar Coater No. 3 used for overcoating in samples 47 and 48
[c]percent haze is measured on a Gardner hazemeter after 1000 cubic centimeters of falling sand. Low haze value indicated higher abrasion resistance
[d]Preparation and curing of ARC (abrasion resistant polymeric film) is described in text for samples 47 to 50
[e]control

EXAMPLE 16

A composite composition having a gelatin-containing overcoating composition was prepared.

A polyvinylidene chloride-primed polyethylene terephthalate substrate was coated with a composition prepared as described in sample 2 of EXAMPLE 1 and cured under the described conditions. The resultant conductive polymeric film was overcoated with a 5 percent aqueous gelatin solution using RDS Bar Coater No. 36. The overcoating was cured by allowing it to stand for one day at room temperature. The resulting composite had a surface resistivity of $4.0 \times 10^8$ ohms/square at 61 percent relative humidity, and $8.8 \times 10^{10}$ ohms/square at 9 percent relative humidity, while a control sample prepared by coating the gelatin layer on the above uncoated substrate had a surface resistivity of greater than $10^{13}$ ohms/square at 53 percent relative humidity.

EXAMPLE 17

Composite compositions having a fabric substrate were prepared. Samples of two commercially available fabrics (e.g., woven acrylic and nylon taffeta) were immersed in a vessel containing 1 percent (solids) of mixtures of A and B (i.e., 3:1 and 3:4 ratios, see EXAMPLE 1) prepared according to the directions of EXAMPLE 1. These coated fabric samples were then squeezed between two rollers to remove excess coating composition and cured by heating at 90° for ten minutes. Static decay tests of the treated fabrics were then performed, as described in EXAMPLE 1, at 22° and 50 percent relative humidity. The results indicated that treated fabrics "bled off" electrostatic charges since they had a static decay value of fractions of a second, whereas, the control samples of untreated fabric had static decay values greater than one second.

EXAMPLE 18

Use of silanol-sulfonate-containing polymeric films of this invention as antifogging films was demonstrated.

A coating formulation prepared according to the directions for sample 1 of EXAMPLE 1 was coated onto polyethylene terephthalate using RDS Bar Coater No. 22 and cured at 90° for 30 minutes. The remaining uncoated side of the substrate was similarly coated with the same formulation which was then cured as above. The composite film just prepared and a control of polyethylene terephthalate film were placed in a freezer at −15° C. for ten minutes. Upon removal of the films from the freezer into a room at 24° C. and 58 percent relative humidity, the composite film did not fog, while the control film did fog. Similarly, when breathed upon, the composite film did not fog, while the control fogged.

Various modifications and alterations of this invention will become apparent to those skilled in the art without departing from the scope and spirit of this invention, and it should be understood that this invention is not to be unduly limited to the illustrative embodiment set forth herein.

We claim:

1. A coating composition comprising 1 to 95 weight percent of a hydrolyzate of a hydroxyorganosilane and 5 to 99 weight percent of an aqueous solvent, said hydroxyorganosilane having the general formula:

$$R^1-Si(OR^2)_3$$

wherein $R^1$ is a di-hydroxy- or polyhydroxy-substituted organic group selected from:
  (a) alkyl groups containing from 2 to about 8 carbon atoms and substituted by 2 to 7 hydroxy groups, with any single carbon atom having at most one hydroxy group attached;
  (b) alkyl groups and cyclic alkyl groups having 2 to 20 carbon atoms, which carbon chain may be interrupted by one or more oxygen atoms and containing at least two hydroxyl groups per 8 carbon atoms with any single carbon atom having at most one hydroxy group attached;
  (c) aralkyl or alkaryl groups containing 7 to 10 carbon atoms, said aralkyl or alkaryl group having 2 to 8 hydroxy groups, with any single carbon atom having at most one hydroxy group attached;

(d) alkenyl groups containing 4 to 8 carbon atoms and 2 to 5 hydroxy groups with any single carbon atom having at most one hydroxy group attached;
(e) cyclic or alkyl-substituted cyclic groups having 3 to 8 carbon atoms and substituted by 2 to 7 hydroxy groups, with any single carbon atom having at most one hydroxy group attached; and $R^2$ is selected from:
(a) hydrogen, and
(b) any organic group such that the $-Si(OR^2)_3$ moiety is hydrolyzable.

2. A coating composition comprising:
(1) 1 to 95 weight percent of a hydrolyzate of a hydroxyorganosilane and 5 to 99 weight percent of an aqueous solvent, said hydroxyorganosilane having the general formula:

$$R^1-Si(OR^2)_3$$

wherein $R^1$ is a hydroxy or polyhydroxy-substituted organic group selected from:
(a) alkyl groups containing from about 2 to about 8 carbon atoms and substituted by 1 to 7 hydroxy groups, with any single carbon atom having at most one hydroxy group attached;
(b) alkyl groups and cyclic alkyl groups having up to 20 carbon atoms, which carbon chain may be interrupted by one or more oxygen atoms and containing at least one hydroxyl group per 8 carbon atoms with any single carbon atom having at most one hydroxy group attached;
(c) aralkyl or alkaryl groups containing 7 to 10 carbon atoms, said aralkyl or alkaryl group having 1 to 8 hydroxy groups, with a single carbon atom having at most one hydroxy group attached;
(d) alkenyl groups containing up to 8 carbon atoms and 1 to 5 hydroxy groups with any single carbon atom having at most one hydroxy group attached;
(e) cyclic or alkyl-substituted cyclic groups having 3 to 8 carbon atoms and substituted by 1 to 7 hydroxy groups, with any single carbon atom having at most one hydroxy group attached; and $R^2$ is selected from:
(a) hydrogen, and
(b) any organic group such that the $Si(OR^2)_3$ moiety is hydrolyzable; and (2) in the range of 0.001 to 50 weight percent of a silanol-sulfonate compound having the general formula:

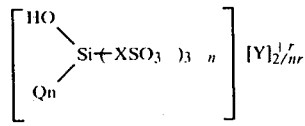

wherein
Q is selected from hydroxyl, alkyl groups containing from 1 to about 4 carbon atoms and alkoxy groups containing from 1 to about 4 carbon atoms;
X is an organic linking group containing up to 10 carbon atoms;
Y is an organic or inorganic cation;
r is equal to the valence of Y; and
n is 1 or 2, with the proviso that the mole ratio of silanol-sulfonate compound to organosilane is less than 5 to 1.

3. The coating composition according to claims 1 or 2 wherein $R^1$ is selected from (1) a hydroxyalkyl group having 2 to 4 carbon atoms, and (2) a dihydroxy-substituted alkyl group having 4 to 8 carbon atoms whose chain may be interrupted by 1 or 2 oxygen atoms.

4. The coating composition according to claim 2 wherein said hydroxyorganosilane or precursor is selected from the group consisting of:

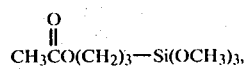

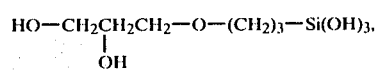

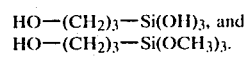

5. The coating composition according to claims 1 or 2 wherein $R^2$ is selected from the group containing straight chain or branched alkyl, alkaryl, acyl, and aroyl groups having up to 8 carbon atoms.

6. The coating composition according to claim 2 wherein X is selected from alkylene, hydroxy-substituted alkylene, and mono-oxa alkylene groups having at least two or more methylene groups; cycloalkylene groups; alkyl-substituted cycloalkylene groups; hydroxy-substituted alkylene groups; hydroxy-substituted mono-oxa alkylene groups; divalent hydrocarbon groups having mono- or poly-oxa backbone substitution; divalent hydrocarbon groups having mono-thia backbone substitution; divalent hydrocarbon groups having mono-thia backbone substitution; divalent hydrocarbon groups having mono-oxa-thia backbone substitution; divalent hydrocarbon groups having dioxo-thia backbone substitution; arylene groups; arylalkylene groups; alkylarylene groups; substituted alkylarylene groups; and alkylarylalkylene groups.

7. The coating composition according to claim 2 wherein Y is selected from the class consisting of hydrogen, alkali metals, aklaline earth metals, transition metals, heavy metals, organic cations of protonated weak bases having an average molecular weight of less than 400 and a $pK_a$ of less than 11, and organic cations of strong organic basis having an average molecular weight of less than 400 and a $pK_a$ of greater than 11.

8. The coating composition according to claim 2 wherein said sulfonate moiety is replaced by a phosphonate moiety.

9. The coating composition according to claim 2 wherein said silanol-sulfonate compound is replaced by a monomeric or polymeric alkyl-, aryl-, alkaryl-, and aralkyl-sulfonic acid, or salt thereof, having up to 20 carbon atoms per sulfonic acid group.

10. The coating composition according to claim 7 wherein said silanol-sulfonate is selected from the group of compounds having the formulae

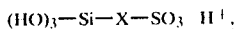

-continued

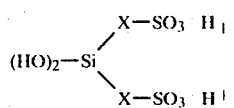, and

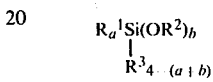

wherein Q' is an alkyl group having 1 to 4 carbon atoms and X is an organic linking group containing up to 10 carbon atoms.

11. The coating composition according to claim 10 wherein said silanol-sulfonate is selected from the group of compounds consisting of

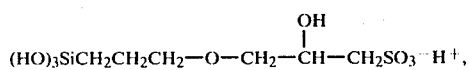

$(HO)_3SiCH_2CH_2SO_3^- H^+$,

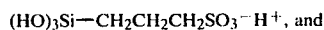

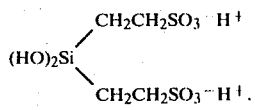

12. The coating composition according to claims 1 or 3 further comprising 1 to 5 weight percent of the total reactive monomers of an acid catalyst.

13. The coating composition according to claim 12 wherein said acid catalyst is hexafluoroantimonic acid hexahydrate.

14. The coating composition according to claim 12 wherein said acid catalyst is a photoactivatable initiator.

15. The coating composition according to claims 1 or 3 further comprising 0.001 to 95 weight percent of additives selected from viscosity modifiers, hardness modifiers, pigments, fillers, UV absorbers, colorants, and leveling agents.

16. The coating composition according to claim 15 wherein said additives further comprise at least one of co-reactive organosilane monomers, oligomers, and polymers.

17. The coating composition according to claim 16 wherein said organosilane monomer or oligomer is selected from methylsilanetriol and oligomers, orthosilicates, and hydroxyorganosilanes having the formula:

$$R_a^1 Si(OR^2)_b$$
$$R^3_{4-(a+b)}$$

wherein
$R^1$ and $R^2$ are defined above;
$R^3$ is a lower alkyl group having 1 to 4 carbon atoms or phenyl;
a = 2 or 3;
b = 1 or 2;
with the proviso that (a+b) is equal to 3 or 4.

18. The cured polymeric product according to claim 1 cured in situ by at least one curing source selected from heat and radiation.

19. The cured polymeric product of claims 1 or 2.

* * * * *